United States Patent [19]

Endo

[11] Patent Number: 4,632,014

[45] Date of Patent: Dec. 30, 1986

[54] PNEUMATIC BOOSTER

[75] Inventor: Mitsuhiro Endo, Kanagawa, Japan

[73] Assignee: Tokico Ltd., Kawasaki, Japan

[21] Appl. No.: 724,283

[22] Filed: Apr. 17, 1985

[30] Foreign Application Priority Data

Apr. 20, 1984 [JP] Japan ............................ 59-58133[U]

[51] Int. Cl.$^4$ ............................................. F15B 9/08
[52] U.S. Cl. ............................ 91/369 A; 91/376 R; 92/48; 92/108; 92/169; 60/547.1
[58] Field of Search ................. 92/48.99 R, 36, 98, 92/44, 49, 108; 91/369 R, 369 A, 376 R; 60/581, 547.1

[56] References Cited

U.S. PATENT DOCUMENTS

| | | | |
|---|---|---|---|
| 3,357,311 | 12/1967 | Cripe | 91/32 |
| 3,364,818 | 1/1968 | Hager | 91/24 |
| 4,256,016 | 3/1981 | Thomas | 91/369 A |
| 4,377,966 | 3/1983 | Parker et al. | 92/48 |
| 4,402,256 | 9/1983 | Ando | 91/369 C |
| 4,484,509 | 11/1984 | Belart et al. | 92/48 |
| 4,535,680 | 8/1985 | Takayama et al. | 91/369 A |

FOREIGN PATENT DOCUMENTS 2920249 11/1979 Fed. Rep. of Germany .
2034429 6/1980 United Kingdom .

Primary Examiner—James C. Yeung
Attorney, Agent, or Firm—Wenderoth, Lind & Ponack

[57] ABSTRACT

A pneumatic booster of the type including a power piston partitioning the interior of a casing into a front chamber and a rear chamber, a reinforcing rod connected to the casing and extending through the front chamber, the power piston and the rear chamber, and a poppet valve for introducing atmospheric air into the rear chamber and actuated by an input shaft which is slidably mounted on the power piston and extends rearwards out of the casing. A passage is formed in the reinforcing rod with one end communicating permanently with a space into which atmospheric air is introduced through the poppet valve when it is actuated, a cut-off valve is provided for communicating or cutting off the passage in the reinforcing rod, and an air introducing device for introducing atmospheric air into the rear chamber is provided independently of the poppet valve.

3 Claims, 3 Drawing Figures

PNEUMATIC BOOSTER

BACKGROUND OF THE INVENTION

The present invention relates to a pneumatic booster adapted particularly to be inserted between a master cylinder and a brake pedal of a hydraulic braking system of a vehicle, to multiply the force applied to the brake pedal by utilizing vacuum pressure such as in an intake manifold of an engine, and to transmit the multiplied force to the master cylinder.

PRIOR ART

In such a conventional pneumatic booster, a power piston is displaceably disposed in a casing and partitions the interior of the casing into a front chamber and a rear chamber, with the front chamber being connected to a source of vacuum pressure such as the intake manifold of the engine and maintained normally at a vacuum pressure, and the rear chamber being selectively connected with the front chamber or with atmospheric air. When the brake pedal is depressed to displace an input shaft forwards, a poppet valve connected to the input shaft cuts off communication between the front chamber and the rear chamber and also communicates the rear chamber with atmospheric pressure so that a differential pressure is produced between the front chamber and the rear chamber. The differential pressure acts to displace the power piston forward and also displace an output shaft which is disposed in front of the power piston forward. A return spring is provided in such a conventional pneumatic booster to urge the power piston rearwards so that when no force is applied on the input shaft, the output force is maintained at zero.

When the driver of the vehicle desires to stop the vehicle temporarily on an inclined road or in waiting a traffic signal, it is required to maintain a force on the input shaft. Thus, the driver must perform a tedious operation to keep depressing the brake pedal.

SUMMARY OF THE INVENTION

An object of the present invention is to solve the above-mentioned problem, and to provide a pneumatic booster which can produce an output force without applying force on the input shaft so that when the driver desires to stop the vehicle, a tedious operation to keep depressing the brake pedal is unnecessary.

According to the invention, in a pneumatic booster of the type including a power piston partitioning the interior of a casing into a front chamber and a rear chamber, a reinforcing rod connected to the casing and extending through the front chamber, the power piston and the rear chamber, and a poppet valve for introducing atmospheric air into the rear chamber and actuated by an input shaft which is slidably mounted on the power piston and extends rearwards to the outside of the casing, there are provided a passage for communicating the rear chamber with a space into which the atmospheric air is introduced through the poppet valve in the reinforcing rod, a cut-off valve for communicating or cutting off the passage in the reinforcing rod and, further, there is provided, independently of the poppet valve, a device for introducing atmospheric air into the rear chamber.

Preferably the cut-off valve and the air introducing device are integrally constituted by a single valve mechanism.

When the shut off valve cuts off the passage which communicates the rear chamber with the atmospheric air introducing space through the poppet valve, and atmospheric air is introduced into the rear chamber by the atmospheric air introducing means, differential pressure is produced between the front chamber and the rear chamber to actuate the power piston, without applying force on the input shaft.

BRIEF DESCRIPTION OF THE DRAWINGS

Further objects and advantages of the invention will become apparent from the following description taken with reference to accompanying drawings which exemplify some preferred embodiments of the invention, in which.

DETAILED DESCRIPTION OF THE PREFERRED EMBODIMENTS

Figure 1:
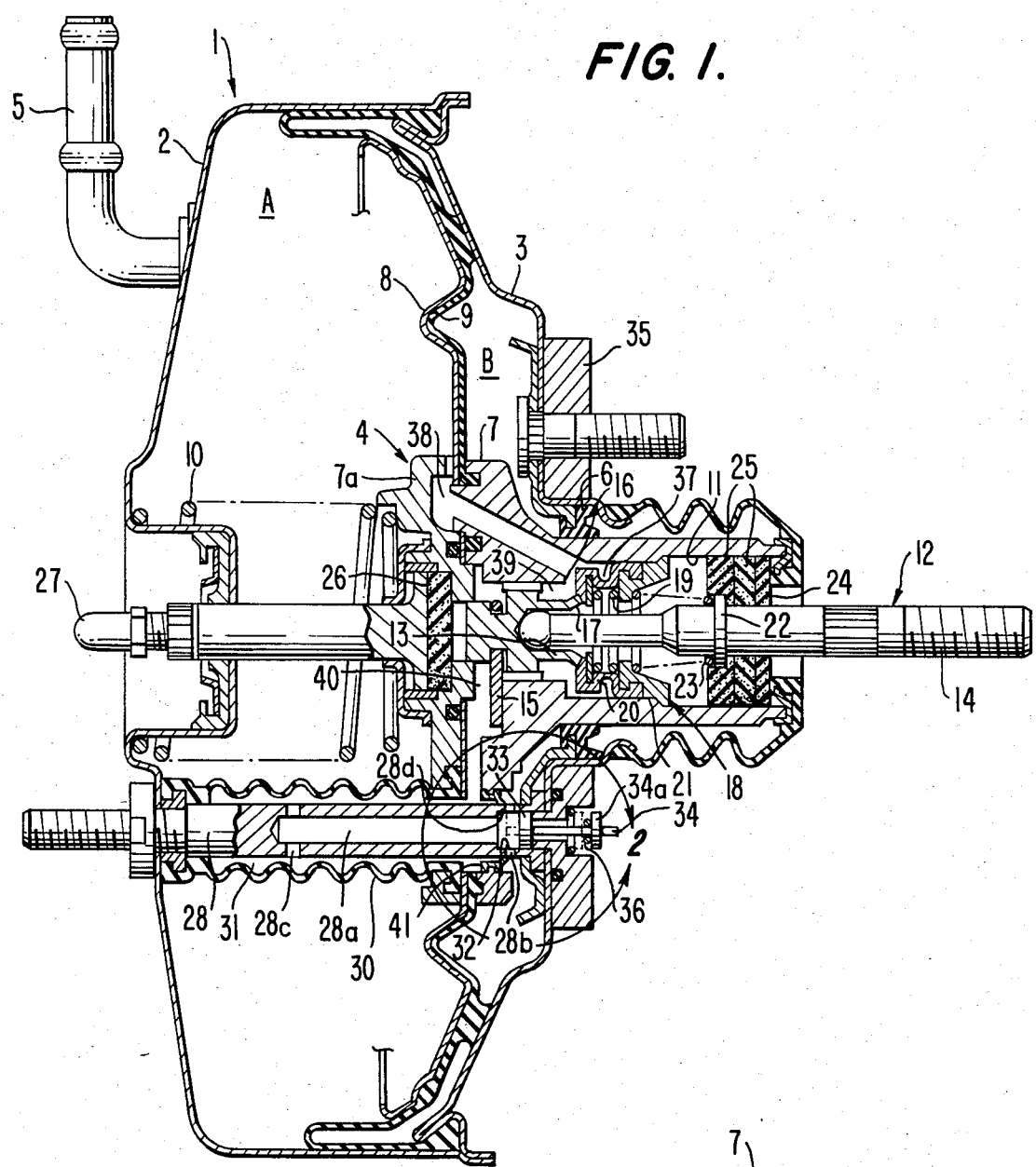
FIG. 1 is a longitudinal sectional view of a first embodiment of the present invention.

FIG. 1 shows a first embodiment of the present invention. In the drawing, 1 designates a casing, and the casing 1 is constituted of a front shell 2 and a rear shell 3. In the casing 1, a power piston 4 is arranged and by which the interior of the casing 1 is partitioned into a front chamber A and a rear chamber B. The front chamber A is connected through a connecting conduit 5 to a source of vacuum pressure such as an intake manifold of an engine of a vehicle (not shown), and is maintained normally at a vacuum pressure.

The power piston 4 is displaced forward (leftward in FIG. 1) when a pressure difference is produced between the front chamber A and the rear chamber B, and is constituted of a piston body 7 which is sealingly and displaceably supported in a central opening formed in the rear end of the rear shell 3 through a seal member 6, a piston head 7a secured to the front side of the piston body 7, and a piston plate 8 and a flexible diaphragm 9 with the radially inner circumference thereof being clamped between the piston body 7 and the piston head 7a. The outer circumference of the diaphragm 9 is clamped between front and rear shells 2 and 3. The power piston 4 is urged rearward (rightward in FIG. 1) by a return spring 10. Further, the power piston 4 is provided with a through hole or a bore 11 along the central axis thereof, and an input shaft 12 is slidably received in the through hole 11. The input shaft 12 is constituted by a plunger 13 and a push rod 14, and the plunger 13 slidably engages with a part of the through hole 11 having a diameter corresponding to the plunger 13. The rear end of the push rod 14 projects out of the rear shell 3 and a brake pedal (not shown) is connected thereto. Numeral 15 designates a key which controls axial sliding movement of the plunger 13 relative to the piston body 7. Valve seats 16 and 17 are formed on a rearwardly facing shoulder of the through hole 11 and rear end of the plunger 13 respectively.

Between the through hole 11 of the power piston 4 and the push rod 14, a poppet valve 18 is provided. The poppet valve 18 cooperates with the valve seats 16 and 17 to selectively communicate the rear chamber B with the front chamber A or with the atmosphere. When the brake pedal is not depressed, i.e. when the input shaft 12 is in the rightwardmost position in FIG. 1, the valve seat 17 on the plunger 13 engages with the poppet valve 18 and the valve seat 16 separates from the poppet valve 18 so that the rear chamber B is isolated from atmosphere and is communicated with the front chamber A so that the pressure in the rear chamber B is equal to that in the front chamber A. When the brake pedal is depressed, i.e. when the input shaft 12 is displaced leftwards in FIG. 1, the poppet valve 18 firstly engages with the valve seat 16 with the valve seat 17 engaging with the poppet valve 18 so that the rear chamber B is isolated from both the front chamber A and the atmosphere and, thereafter, the poppet valve 18 separates from the valve seat 17 on the plunger 13 with the valve seat 16 engaging with the poppet valve 18, whereby the rear chamber B is isolated from the front chamber A and is communicated with the atmosphere so that the pressure in the rear chamber B increases and a pressure difference is formed between chambers A and B. The poppet valve 18 is constituted of front and rear members 20 and 21 which are urged away from each other by a spring 19 which is interposed between the members 20 and 21. The poppet valve is urged toward the valve seats 16 and 17 to engage therewith by a spring 23 which is interposed between a spring retainer 22 on the push rod 14 and the rear end of the valve member 21. Numeral 24 designates a silencer, and 25 designates an air cleaner. The inner space of the poppet valve 18 is communicated with atmosphere.

On the side of the through hole 11 of the power piston 4 toward the front chamber is a reaction disc 26 formed of a pressure deformable material, a small clearance normally being formed between the plunger 13 and reaction disc 26, i.e. when the brake pedal is not depressed. On the front side of the reaction disc 26 is an output shaft 27 aligned with the input shaft 12. The front end (the left end in FIG. 1) of the output shaft 27 projects outward from the front shell 2, and an input shaft of a master cylinder (not shown) is connected to the projected end.

Numeral 28 designates a reinforcing rod which extends through the front chamber A, the power piston 4 and the rear chamber B. The reinforcing rod 28 is secured to the front and rear shells 2 and 3 and is mounted on a suitable place on the vehicle body, and supports the casing 1 and increases the strength or the rigidity of the casing 1. Usually two or more reinforcing rods are provided, only one of which is shown in the drawing.

According to the invention, a bore 28a is formed in the reinforcing rod 28 coaxially to extend from the rear end thereof to about longitudinally mid portion. The bore 28a is communicated with the rear chamber B through small openings 28b at the rear end portion of the rod 28, and the bore is also communicated with a space 31 which is formed between the rod 28 and an extendable and contractible seal member 30 which surrounds the outer periphery of the rod 28 with opposite ends thereof being secured to the front shell 2 and the power piston 4 respectively, through small openings 28c which are formed in the mid portion of the rod 28.

In a large diameter portion 32 formed in the rear end portion of the bore 28a, a valve 33 is disposed. The valve 33 has a spring seat 34a integral with a valve stem 34. A spring 36 is interposed between the spring seat 34a and a rearwardly facing recess in a support plate 35 urges the valve 33 rearwards. The support plate 35 is a generally annular plate member abutting the rear surface of the rear shell 3, and cooperates with the reinforcing rods 28 in supporting the casing 1. The valve 33 has a valve head 33a on the front end thereof and, when the valve 33 is in the rearmost position shown by solid lines in FIG. 1, the bore 28a and the small openings 28b are communicated each other and are isolated from atmospheric air. When the valve 33 is displaced forward to engage with a valve seat 28d formed on the rear end of the bore 28a as shown by chain lines in FIG. 1, the bore 28a is closed and the rear chamber B is communicated with atmospheric air through the small openings 28b. Thus, the valve 33 has two functions, i.e. to isolate the bore 28a from the rear chamber B and to introduce atmospheric air into the rear chamber B, when the valve 33 is at the forwardmost position. The valve stem 34 extends rearwards and outwards to enable actuation from outside.

A through opening 38 is formed in the upper portion of the piston body 7 to communicate the front chamber A with an annular space 37 which is formed between the poppet valve 18 and the through hole 11. When the poppet valve 18 is separated from the valve seat 16, the space 37 is communicated through a clearance between the poppet valve 18 and the valve seat 16 with a space 39 which is formed between the plunger 13 and the through hole 11. When the poppet valve 18 is displaced from the valve seat 17 of the plunger 13, the space 39 is communicated with atmospheric air. The space 39 is a space according to the invention into which atmospheric air is introduced through the poppet valve. The space 39 is communicated permanently, through a space 40 which is formed between the piston body 7 and the piston head 8, with the space 31 which is formed between the reinforcing rod 28 and the seal member 30. Numeral 41 designates a seal member which seals the reinforcing rod 28 to the piston body 7.

The operation of the above described pneumatic booster will be explained. When the brake pedal is depressed from the condition shown in FIG. 1, a thrust force is applied to the push rod 14 so that the plunger 13 and poppet valve 18 are displaced forwards, and the poppet valve 18 engages with the valve seat 16 to cut off communication between the spaces 37 and 39. When the push rod 14 is displaced further, the valve seat 17 of the plunger 13 separates from the poppet valve 18. Thus, atmospheric air is introduced from inside of the poppet valve and flows into the space 39. The air further flows through the space 40, space 31, small openings 28c, the bore 28a, and small openings 28b into the rear chamber B. Consequently, atmospheric air is introduced into the rear chamber B, and a pressure difference is produced between the rear chamber B and the front chamber A. The power piston 4 is pushed forwards by the differential pressure to produce an output force through the output shaft 27.

However, even when the input shaft 12 is in the inoperative condition, the valve 33 can be displaced forwards as shown by chain lines in FIG. 1. Then, communication between the rear chamber B and the front chamber A is cut off, and also atmospheric air is introduced into the rear chamber B through the small opening 28b, and consequently a pressure difference is produced between the front chamber A and the rear chamber B which displaces the power piston forward to produce an output force through the output shaft 27. It will be understood then, in such case, the input shaft 12 is also displaced forward together with the power piston 4, and the communication between the spaces 39 and 40 and the front chamber A is maintained. In order to return to the zero output condition, the valve 33 is returned to the original position shown by solid lines in FIG. 1, whereby the rear chamber B is communicated with the front chamber A to eliminate the pressure difference between the chambers A and B.

Figure 2:
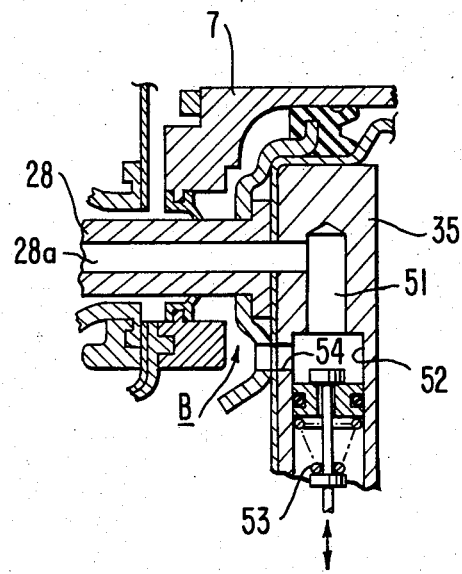
FIG. 2 is an enlarged partial sectional view of a modified form of FIG. 1.

FIG. 2 shows a modified form of the first embodiment shown in FIG. 1, in which the drawing shows a portion corresponding to encircled portion II in FIG. 1. As shown, the support plate 35 has a 90° bent opening 51 which is communicated permanently with the bore 28a in the reinforcing rod 28. The outer open end portion of the opening 51 forms a large diameter portion 52 in which a valve 53 is slidably accommodated for sliding in the direction perpendicular to the direction of the axis of the reinforcing rod 28. The valve 53 operates the same as the valve 33 shown in FIG. 1. That is, when the valve 53 is at the lowermost position in FIG. 2, small openings 54 which are communicated with the rear chamber B are communicated with the opening 51, and also the openings 54 and 51 are isolated from atmospheric air. When the valve 53 is at the uppermost position, the opening 51 is closed and the rear chamber B is communicated through the small openings 54 with atmospheric air. The functions of the embodiment shown are similar to those of the embodiment shown in FIG. 1, so that detailed explanation thereof is omitted.

Figure 3:
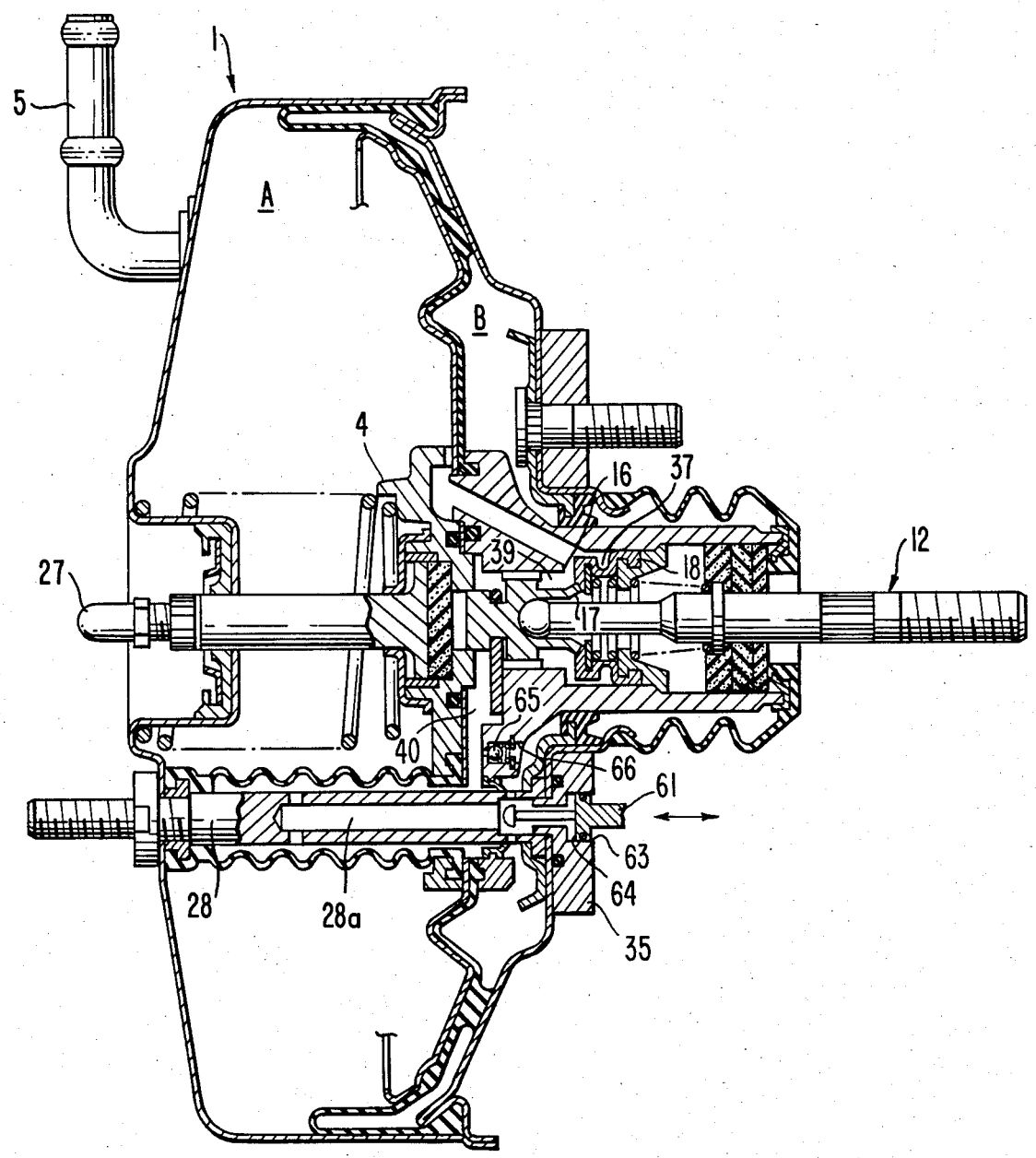
FIG. 3 is a longitudinal sectional view of a second embodiment of the present invention.

FIG. 3 shows a second embodiment of the present invention. In the embodiment shown, a valve which closes the bore 28a in the reinforcing rod 28 and a valve which introduces atmospheric air into the rear chamber B are separately provided. That is, numeral 61 designates a shut off valve which opens or closes the bore 28a and has a large diameter portion 64, which slidably and hermetically engages a through hole 63 in the support plate 35, on the rear portion of a valve stem 62 of the valve 61. Numeral 65 designates a check valve which is disposed in a through hole (bypass passage) 66 formed in the piston body 7 between the space 40 and the rear chamber B, to allow one direction flow from the space 40 to the rear chamber B.

In the above described pneumatic booster, when the valve 61 is displaced forwards to close the bore 28a, and the input shaft 12 is displaced forwards, the poppet valve 18 engages with the valve seat 16 to cut off the communication between the spaces 37 and 29. When the input shaft 12 is displaced further forwards, the valve seat 17 on the plunger 13 separates from the poppet valve 18 to introduce atmospheric air into the space 39. The introduced atmospheric air is further introduced through the space 40 and the check valve 65 into the rear chamber B to produce a pressure difference between the rear chamber B and the front chamber A to effect forward displacement of the power piston 4 which produces an output force through the output shaft 27. After that, even the input force on the push rod 12 is released and the push rod 14 and the plunger 13 are returned to the original positions shown, since the bore 28a is closed by the valve 61, communication between the front chamber A and the rear chamber B is cut off resulting in maintaining the pressure in the rear chamber B at atmospheric pressure. Consequently, the differential pressure between the front chamber A and the rear chamber B is retained to maintain the output force.

When the valve 61 is displaced rearwards to the original position shown, the front chamber A is communicated with the rear chamber B to eliminate the differential pressure so that the output force is reduced to zero.

As explained hereinbefore, according to the invention, it is possible to maintain output force even though the force applied on the input shaft is released. Further, by providing an air introducing device for introducing atmospheric air separately from the poppet valve which is associated with the input shaft, it is possible to produce an output force without applying force on the input shaft.

Thus, the vehicle can be stopped without continuous depression of the brake pedal when the driver wishes temporary stoppage of vehicle on an inclined road or in waiting for traffic signals. The valve of the air introducing device is mounted in a stationary reinforcing rod, so that it has a simple construction, and is easy to manufacture and assemble.

What is claimed is:

1. A pneumatic booster comprising:
   a casing having a front and a rear shell and a flexible diaphragm mounted between said shells and partitioning the interior of said casing into front and rear chambers;
   means for permanently communicating said front chamber with a source of vacuum;
   a power piston slidably mounted on said rear shell and further mounted on said flexible diaphragm;
   an output rod connected to said power piston and extending through said front chamber to the outside of said booster;
   an input rod slidably mounted on said power piston and extending rearward through said power piston;
   a poppet valve mechanism mounted on said power piston;
   passage means for connecting said poppet valve which said rear chamber, said poppet valve mechanism being operatively associated with said input rod for being operated by movement of said input rod to selectively connect said rear chamber with said front chamber or with atmospheric pressure;
   a reinforcing rod means extending through said front and rear chambers and on which the power piston is slidably mounted, the opposite ends of said reinforcing rod being connected respectively to said front and rear shells, said reinforcing rod means having an axial bore therein forming a part of said passage means;
   a cut-off valve in said bore in said reinforcing rod means for opening or closing said passage means; and
   valve means operatively associated with said rear chamber for introducing atmospheric air from outside said booster into said rear chamber independently from said poppet valve mechanism.

2. A pneumatic booster as claimed in claim 1 in which said cut-off valve and said air introducing valve means comprise a plunger valve in said bore in said reinforcing rod means.

3. A pneumatic booster comprising:
   a casing having a front and a rear shell and a flexible diaphragm mounted between said shells and partitioning the interior of said casing into front and rear chambers;
   means for permanently communicating said front chamber with a source of vacuum;
   a power piston slidably mounted on said rear shell and further mounted on said flexible diaphragm;
   an output rod connected to said power piston and extending through said front chamber to the outside of said booster;
   an input rod slidably mounted on said power piston and extending rearward through said power piston;

a poppet valve mechanism mounted on said power piston;

passage means for connecting said poppet valve with said rear chamber, said poppet valve mechanism being operatively associated with said input rod for being operated by movement of said input rod to selectively connect said rear chamber with said front chamber or with atmospheric pressure;

a reinforcing rod means extending through said front and rear chambers and on which the power piston is slidably mounted, the opposite ends of said reinforcing rod being connected respectively to said front and rear shells, said reinforcing rod means having an axial bore therein forming a part of said passage means;

a cut-off valve in said bore in said reinforcing rod means for opening or closing said passage means; and non-return valve means connected between said passage means and said rear chamber upstream of said cut-off valve for introducing atmospheric air from said poppet valve into said rear chamber when said cut-off valve means is closed, and preventing the air thus introduced from escaping through said poppet valve until said cut-off valve is opened.

* * * * *